US008185258B2

(12) United States Patent
Dey et al.

(10) Patent No.: US 8,185,258 B2
(45) Date of Patent: May 22, 2012

(54) AUTOMATIC STRATEGIC OFFSET FUNCTION

(75) Inventors: Michael E. Dey, Seattle, WA (US); Bradley D. Cornell, Lake Stevens, WA (US); Peter D. Gunn, Bellevue, WA (US); Robert J. Myers, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/713,629

(22) Filed: Feb. 26, 2010

(65) Prior Publication Data

US 2010/0161159 A1 Jun. 24, 2010

Related U.S. Application Data

(62) Division of application No. 11/763,327, filed on Jun. 14, 2007, now Pat. No. 7,698,026.

(51) Int. Cl.
*G01C 23/00* (2006.01)

(52) U.S. Cl. ............................ 701/3; 701/205; 340/945

(58) Field of Classification Search ............. 701/3, 301, 701/4, 205; 340/945, 979
See application file for complete search history.

(56) References Cited

U.S. PATENT DOCUMENTS 3,696,671 A * 10/1972 Steigleder et al. .......... 73/178 R
4,419,079 A * 12/1983 Georges et al. ................. 434/43
5,842,142 A * 11/1998 Murray et al. .................. 701/16
6,255,965 B1 * 7/2001 D'Orso ......................... 340/946
6,405,124 B1 * 6/2002 Hutton .......................... 701/200
6,531,978 B2 * 3/2003 Tran ............................... 342/29
6,922,631 B1 * 7/2005 Dwyer et al. ................. 701/206
6,937,165 B2 * 8/2005 Rogers .......................... 340/963
6,963,795 B2 * 11/2005 Haissig et al. .................... 701/7
7,194,353 B1 * 3/2007 Baldwin et al. ............... 701/206
7,237,747 B1 * 7/2007 Baudry ....................... 244/76 R
7,337,063 B1 * 2/2008 Oberg et al. .................. 701/213
7,428,450 B1 * 9/2008 Oberg ............................... 701/4

(Continued)

FOREIGN PATENT DOCUMENTS

WO WO2005012837 A1 2/2005

OTHER PUBLICATIONS

"Conference Statement Implementation of Lateral Offset Procedures", SLOP Statement, 62nd IFALPA Conf, Mar. 2007, retrieved Aug 13, 2009 at http://www.ifalpa.org/ifalpa-committees/air-traffic-services/current-hot-topics/125.html, 2 pgs.

(Continued)

*Primary Examiner* — Helal A Algahaim
(74) *Attorney, Agent, or Firm* — Caven & Aghevli LLC

(57) ABSTRACT

A system may generate a modified flight plan for an aircraft based on an original flight plan. The system may provide an automatic strategic offset function that includes an autoflight system; a sensor system including at least one of a global positioning system, an inertial reference unit, or an air data computer; and a flight management computer. The flight management computer may be operably coupled with the autoflight system and/or the sensor system. The flight management computer may process a flight plan of the vehicle and generate a non-uniform offset value in the vertical and/or lateral orientation between the flight plan and a boundary. The offset value may be used to create an offset flight plan for navigating an aircraft.

5 Claims, 5 Drawing Sheets

U.S. PATENT DOCUMENTS

| | | | | |
|---|---|---|---|---|
| 7,432,828 | B2 * | 10/2008 | He et al. | 340/945 |
| 2003/0004619 | A1 * | 1/2003 | Carriker et al. | 701/3 |
| 2003/0023354 | A1 * | 1/2003 | Brust et al. | 701/3 |
| 2003/0193408 | A1 * | 10/2003 | Brown et al. | 340/945 |
| 2004/0189492 | A1 * | 9/2004 | Selk et al. | 340/973 |
| 2005/0165516 | A1 * | 7/2005 | Haissig et al. | 701/4 |
| 2005/0192717 | A1 | 9/2005 | Tafs et al. | |
| 2005/0216138 | A1 * | 9/2005 | Turung | 701/3 |
| 2006/0004496 | A1 * | 1/2006 | Tucker et al. | 701/4 |
| 2006/0089760 | A1 * | 4/2006 | Love et al. | 701/4 |
| 2006/0129285 | A1 * | 6/2006 | Gremmert | 701/3 |
| 2007/0145183 | A1 * | 6/2007 | Baudry | 244/76 R |
| 2007/0188350 | A1 * | 8/2007 | He et al. | 340/979 |

OTHER PUBLICATIONS

Hering, "Vital—An Advanced Time-Based Tool for the Future 4D ATM Environment", Digital Avionics Systems Conference, 2004. The 23rd Salt Lake City, UT, Oct. 24-28, 2004, Piscataway, NJ, USA, IEEE, US, vol. 1, Oct. 24, 2004, pp. 3.B.5-1-3.B.5-8.

"Procedures for Strategic Lateral Offsets within NAT Airspace", Apr. 2007, Intl Civil Aviation Org Statement on SLOP, retrieved Aug. 13, 2009 at http://www.nat-pco.org/nat/Slop.pdf, 1 pg.

* cited by examiner

AUTOMATIC STRATEGIC OFFSET FUNCTION

CROSS REFERENCE TO RELATED PATENT APPLICATIONS

This patent application is a divisional application of co-pending, commonly owned U.S. patent application Ser. No. 11/763,327, entitled "Automatic Strategic Offset Function," filed Jun. 14, 2007, which application is herein incorporated by reference.

TECHNICAL FIELD

The present disclosure teaches methods and systems for aircraft navigation, and more specifically, to methods and systems for providing an automatic strategic offset function.

BACKGROUND

With the advent of satellite-based navigation, aircraft navigation has become very accurate. While improved navigation accuracy in general is beneficial to aircraft navigation, it also has drawbacks. For example, published flight paths may become crowded with aircraft sharing the same flight plan that is generated automatically for many aircraft.

To address the issue of highly accurate aircraft navigation crowding published flight paths, a manual flight crew procedural workaround may be recommended. The procedural workaround may include having the flight crew manually add a continuous offset to the flight plan. For example, the flight crew may add an offset of one nautical mile to the right of the flight plan, and thus the flight plan may deviate continually by one mile during the duration of the manually entered offset.

A disadvantage of the current method is that existing flight management computers (FMCs) only allow manual entry of flight plan offsets in whole number nautical miles. Further, the offset value is a fixed value for the duration of the offset, increasing the likelihood of flight crews picking the same offset value. Although desirable results have been achieved using prior art methods and systems, improved aircraft flight plan navigation would have utility.

SUMMARY

Embodiments of methods and systems for providing an automatic strategic offset function are disclosed. In one embodiment, a method for enhancing the collision avoidance capability of an aircraft includes determining a flight plan, determining a boundary for the flight plan, generating a variable offset from the flight plan that is within the boundary, the variable offset including a lateral offset distance, and navigating an aircraft based on the variable offset.

In another embodiment, a system for providing an automatic strategic offset function includes an autoflight system; a sensor system including at least one of a global positioning system, an inertial reference unit, or an air data computer; and a flight management computer. The flight management computer may be operably coupled with the autoflight system and/or the sensor system, the flight management computer processing a flight plan of the vehicle to generate a non-uniform offset value in the vertical and lateral orientation between the flight plan and a boundary, the offset value used to create an offset flight plan for navigating an aircraft.

In a further embodiment, a method includes determining a flight plan segment between two waypoints and creating an offset value between a flight plan segment and a boundary.

The offset may include a vertical offset and a lateral offset from the flight plan segment. The offset value may be updated for each new flight plan segment. Further, an aircraft may be navigated substantially along a modified flight plan segment generated from the offset value.

The features, functions, and advantages can be achieved independently in various embodiments of the present disclosure or may be combined in yet other embodiments.

BRIEF DESCRIPTION OF THE DRAWINGS

Embodiments of systems and methods in accordance with the present disclosure are described in detail below with reference to the following drawings.

DETAILED DESCRIPTION

Methods and systems for providing an automatic strategic offset function are described herein. Many specific details of certain embodiments of the disclosure are set forth in the following description and in FIGS. 1 through 6 to provide a thorough understanding of such embodiments. One skilled in the art, however, will understand that the present disclosure may have additional embodiments, or that the present disclosure may be practiced without several of the details described in the following description.

Figure 1:
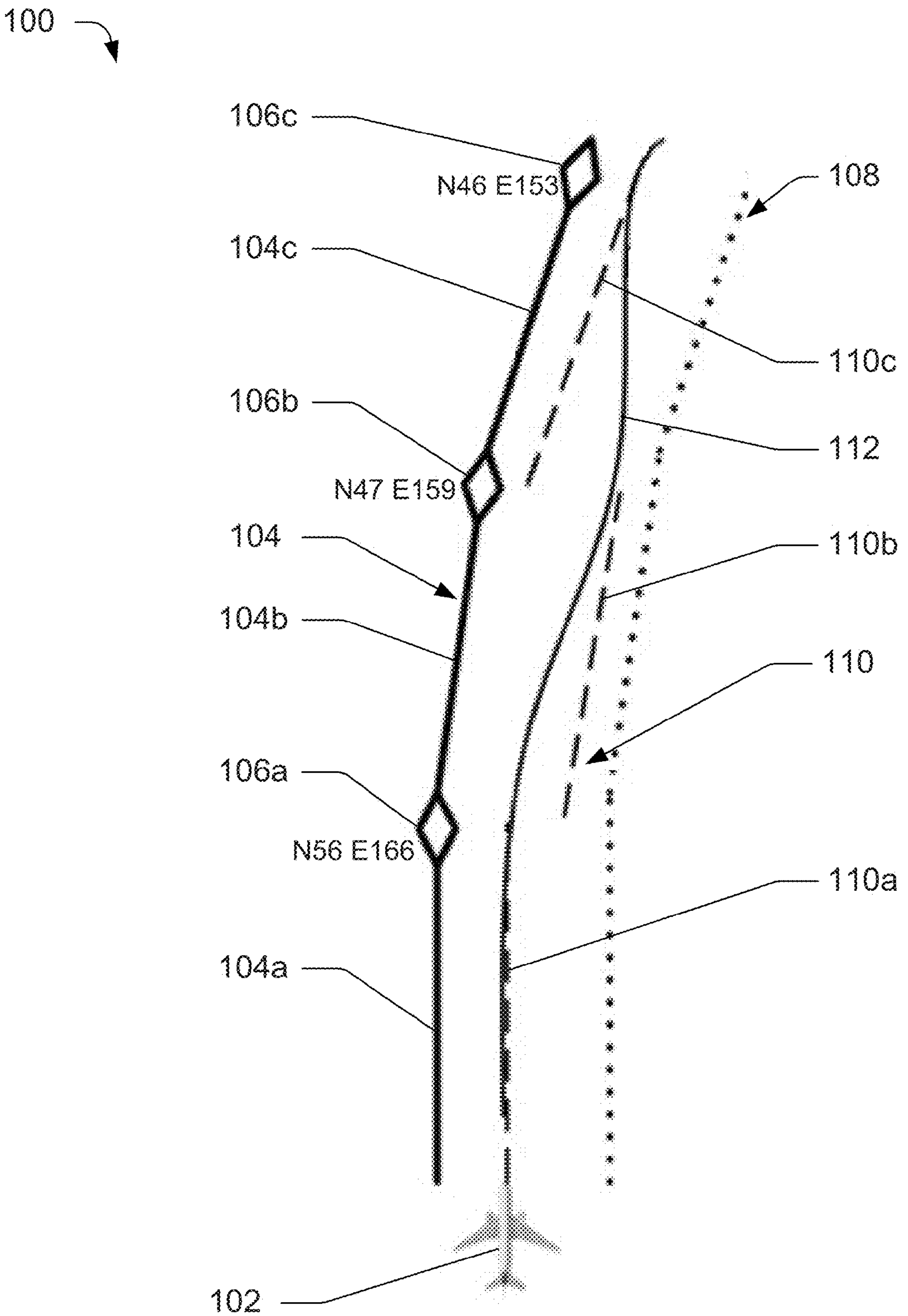
FIG. 1 is a plan view of a flight plan including an automatic strategic offset in accordance with an embodiment of the disclosure.

FIG. 1 is a plan view of a flight plan including an automatic strategic offset in accordance with an embodiment of the disclosure. The environment 100 includes an aircraft 102 directed along programmed flight management computer (FMC) flight plan legs 104, such as flight plan legs 104*a*, 104*b*, and 104*c*. Each flight plan leg 104*a*, 104*b*, and 104*c* may be directed to waypoints 106*a*, 106*b*, and 106*c*, respectively. The waypoints 106*a*, 106*b*, and 106*c* may be airspace fix (i.e., published navigation points in space), global position system (GPS) coordinates (e.g., latitude and longitude position) or any other nautical reference point.

The environment 100 may include a maximum allowable offset or boundary 108. Conventionally, the maximum allowable offset or boundary 108 is provided to the right of the flight plan legs 104. However, alternative embodiments may include a left boundary or both right and left boundaries. Left and right boundaries may be substantially equal distance from the flight plan legs 104 or different distances from the flight plan legs such that the left boundary distance is not equal to the right boundary distance when measured from the flight plan legs.

Embodiments of the current disclosure may provide offsets 110 to the flight plan legs 104. In some embodiments, the offsets 110 may be computed by the FMC or other computing system or device. In addition, the FMC may create random varying offsets. In one configuration, the FMC may create random segments for the offsets 110 corresponding to flight plan legs 104*a*, 104*b*, and 104*c*. For example, the first flight plan leg 104*a* may have a corresponding first offset 110*a*, the second flight plan leg 104*b* may have a corresponding second offset 110*b*, and the third flight plan leg 104*c* may have a corresponding third offset 110*c*.

In other embodiments, the offsets 110 may be continuous and align with the flight plan legs 104. The offsets may also be generated by a user input, a computer, or a combination of both. For example, the flight crew may control the offset 110 of the flight plan legs 104 by inputting the offset 110 into the FMC. During operation, the aircraft 102 navigates along a flight plan 112 that follows at least a portion of the offset 110 from the flight plan legs 104, while remaining within the boundary 108.

In some embodiments, the automatic strategic offset 110 is configured to use existing information contained in the flight management system to automatically apply an intentional flight plan variation when appropriately activated. For example, a user may be able to select flight offsets 110, or portions thereof, used for a previous flight.

Figure 2:
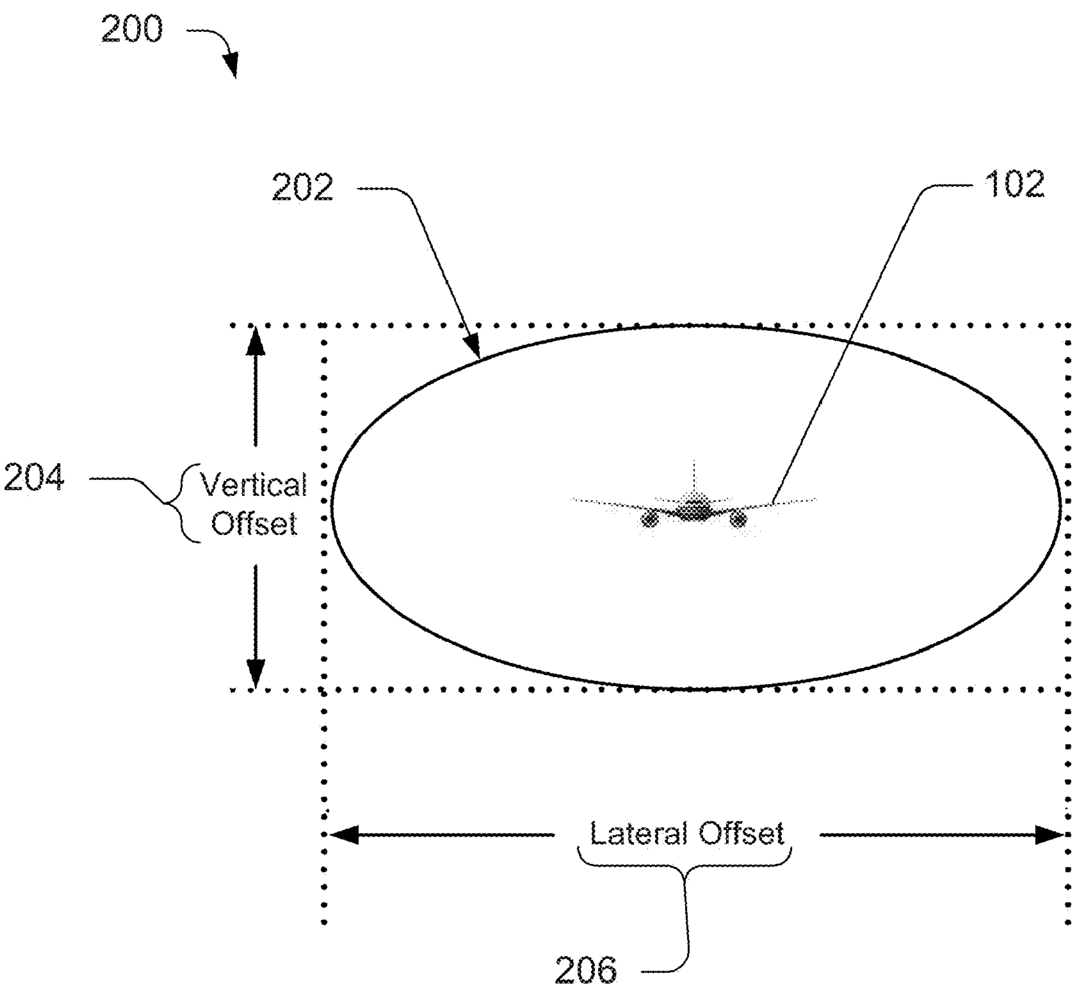
FIG. 2 is a front elevation view of an aircraft with lateral and vertical offset boundaries in accordance with another embodiment of the disclosure.

FIG. 2 is a front elevation view of an aircraft with lateral and vertical offset boundaries in accordance with another embodiment of the disclosure. An environment 200 includes the aircraft 102 within a variable airspace 202. The variable airspace 202 may be defined by a vertical offset 204 (e.g., a Reduced Vertical Separation Minima (RVSM) altitude uncertainty/variability) and a lateral offset 206. The variable airspace 202 may be in both the vertical (altitude) and lateral (horizontal) dimensions, within the limits prescribed by air navigation service providers. Currently, FMC offsets 100 are typically applied laterally, and are manually-entered values in units of whole number nautical miles. Once entered, the lateral offset remains a fixed value until manually changed by the flight crew.

Embodiments of the disclosure may provide the offset 110 automatically such as by a system generated offset value provided by, for example, the FMC. The automatic offset 110 may take into account Required Navigation Performance (RNP) (e.g., current oceanic standard of RNP 4.0) and Reduced Vertical Separation Minima (RVSM) (e.g., current standard of +/−65 feet) associated with the flight plan leg 104. The offset 110 may be compared to Actual Navigation Performance (ANP) and altitude data when determining the values for the offset 110. Additionally, in embodiments of the disclosure, the flight crew may enter non-whole numbers (e.g., decimals, fractions, etc.) for the offset 110 which may significantly increase the variability in offsets used by flight crews to modify flight plan legs 104.

Embodiments of the disclosure may allow an aircraft navigation and autoflight system to randomly vary the offsets 110 for the aircraft flight plan within the variable airspace 202 to decrease the likelihood of conflict with another aircraft flying the same route (e.g., collision avoidance). The aircraft 102 may be configured to vary the vertical position within the vertical offset 204 and/or vary the lateral position within the lateral offset 206. Reduced Vertical Separation Minima (RVSM) may further reduce the likelihood of conflict with another aircraft flying the same route. In particular, the offset 110 may be beneficial to aircraft navigating in oceanic and remote airspace where radar is not available. In addition, randomly varying the offset 110 from the programmed flight plan legs 104 may aid in reducing wake vortex turbulence resulting from the aircraft entering a vortex produced by an aircraft 102 flying ahead on the same flight plan legs 104 at different altitudes (e.g., higher altitudes). In other embodiments, the vertical offset 204 or lateral offset 206 may be generated manually such as with user input.

Figure 3:
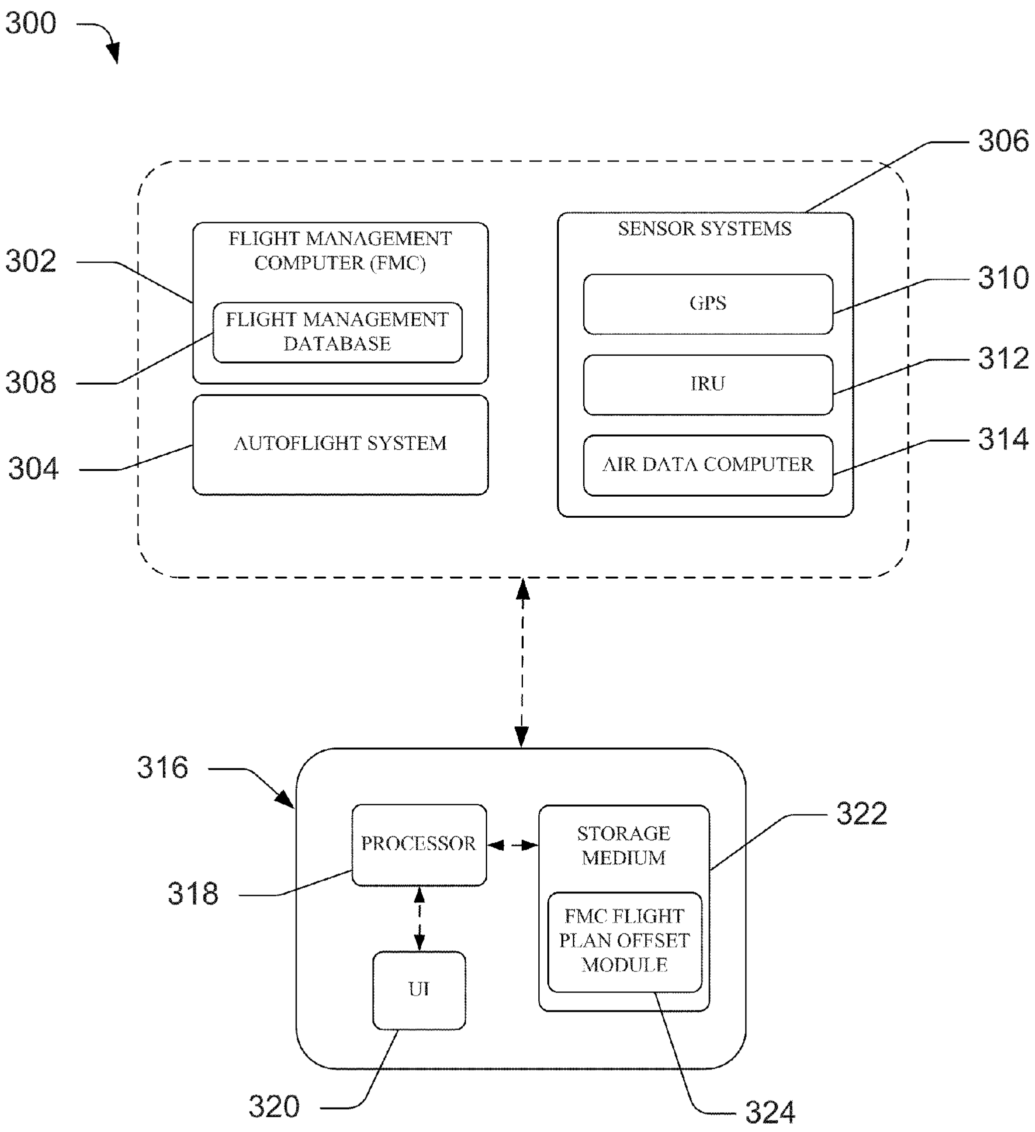
FIG. 3 is a schematic of a system for providing a flight plan with an automatic strategic offset in accordance with yet another embodiment of the disclosure.

FIG. 3 is a schematic of an exemplary system 300 for providing a flight plan with an automatic strategic offset in accordance with yet another embodiment of the disclosure. The system 300 may include a flight management computer (FMC) 302 operably connected to an autoflight system 304 and sensor system 306. The FMC 302 may further include a flight management database 308. The flight management database 308 may facilitate using existing flight information to automatically, or otherwise, apply an intentional flight plan variation. In addition, the flight management database, or other storage medium, may retain a maximum value for the vertical and/or lateral offset for each segment of the flight plan. The sensor system 306 may include a GPS 310, an inertial reference unit (IRU) 312, an air data computer 314, or other components to assist in orientation, navigation, and control of the aircraft 102. For example, the GPS 310 may facilitate locating waypoints 106*a*, 106*b*, and 106*c* and determining new coordinates for the offset 110 that is randomly generated to adjust the flight plan from the flight plan legs 110.

The system 300 may include a number of components 316. The system 300 may include one or more processors 318 that are coupled to instances of a user interface (UI) 320. The system 300 may include one or more instances of a computer-readable storage medium 322 that are addressable by the processor 318. As such, the processor 318 may read data or executable instructions from, or store data to, the storage medium 322. The storage medium 322 may contain a FMC flight plan offset module 324, which may be implemented as one or more software modules that, when loaded into the processor 318 and executed, cause the system 300 to perform any of the functions described herein, such as to generate an automatic flight plan offset. Additionally, the storage medium 322 may contain implementations of any of the various software modules described herein.

Figure 4A:
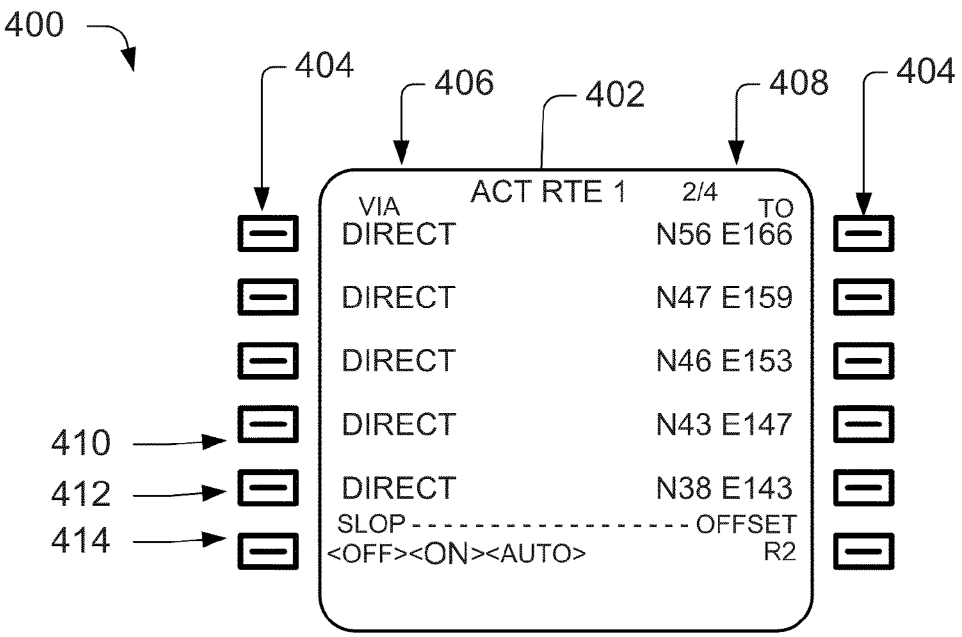
FIG. 4*a* is an exemplary user interface for providing an automatic strategic offset and FIG. 4*b* is an exemplary user interface providing additional control over the offset in accordance with an embodiment of the disclosure.

FIG. 4*a* is an exemplary user interface 400 for providing an automatic strategic offset. The user interface 400 may be an interface for the FMC 302 and display information typical for the FMC. The user interface 400 may include a display portion 402 and line select keys 404. The display portion 402 may be organized in columns, and include columns such as a direction column 406 and a waypoint column 408. Each line select key 404 may correspond to a line in the display portion 402, such as line 410. The line 410 may display information or data in the direction column 406 and the waypoint column 408. In addition, a strategic lateral offset procedure (SLOP) 412 setting may be displayed, which may be associated with the line 410. The SLOP 412 display may indicate the status for a SLOP setting, such as "Offset," "Inactive," or another SLOP setting. An offset line 414 may provide further detail about the offset values or SLOP setting. For example, the offset line 414 may include an "On," "Off," or "Auto" setting. The "Auto" setting may provide a system controlled automatic offset. The offset line 414 may also include an offset distance such as a distance in nautical miles (NM). For example, the offset distance may be "R2," which may represent an offset of two nautical miles to the right of a flight plan leg 104. The offset distance may be system generated (e.g., by the FMC 302) or it may be an input from a user.

Figure 4B:
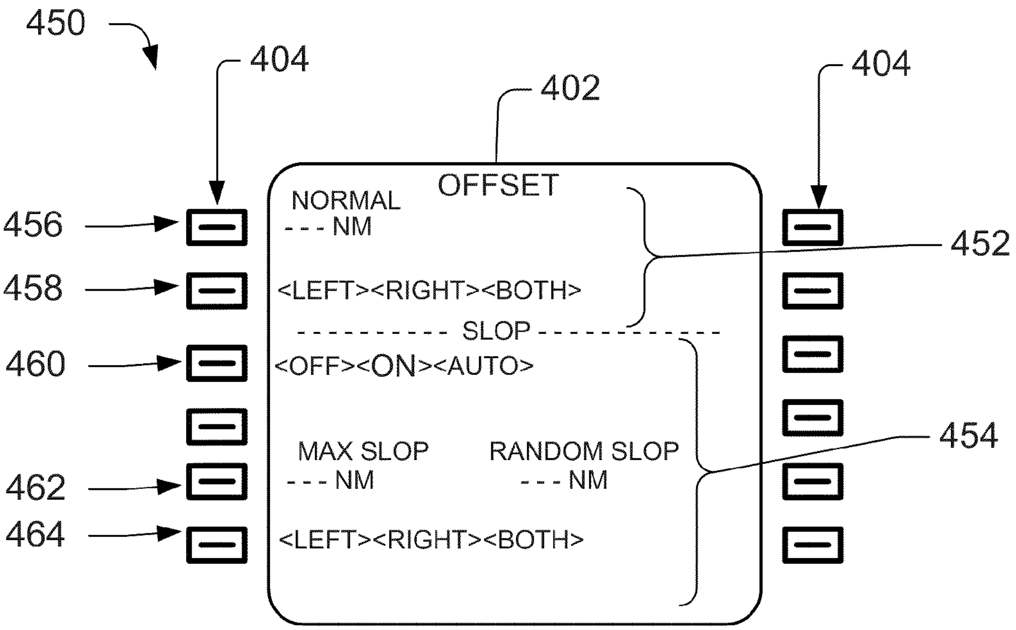

FIG. 4*b* is an exemplary user interface providing additional control over the offset in accordance with an embodiment of the disclosure. The additional user interface 450 provide further information to a user and facilitate data entry and control over an automatic strategic offset function as disclosed herein. The additional user interface 450 may include a manual (or normal) portion 452 and an automatic portion 454. The manual portion 452 may include a distance line 456 for a user to provide a distance, such as in nautical miles, for the offset 110. The distance may include fractions, decimals, or other inputs that specify a distance. A direction selector line 458 may allow the user to select whether the distance is measured to the right, left, or both right and left of the flight plan leg 104.

The automatic portion 454 may include a status line 460 with settings including "On," "Off," or "Auto" as described above. The automatic portion 454 may engage and/or disengage the offset 110 from the flight plan leg 104 as appropriate for an airspace environment based on information from the flight management database 308.

The automatic portion 454 may also include one or more SLOP distance fields 462. For example, the distance fields 462 may include a maximum SLOP distance and a random SLOP distance. The maximum SLOP value may be a user entered distance or a system generated distance that corresponds to the boundary 108. The random SLOP distance may be a random distance generated by the FMC 302, or other computing system, that is within or equal to the range limits (or boundary 108) for the SLOP value (i.e., the maximum SLOP). For example, if the boundary 108 (or maximum SLOP distance) is two miles, the random SLOP would be a value between zero and two miles.

The automatic portion 454 may also include a direction selector line 464 to allow the user to select the whether the distance is measured to the right, left, or both left and right with respect to the flight control leg 104. For example, if "both" is selected for the direction selector line 464 and the maximum SLOP is two miles, then the random SLOP may be any value between two miles to the left and two miles to the right, thus a range of four lateral miles.

In further embodiments, the user interface 400 and the additional user interface 450 may include controls for the offset 110 for the vertical offset 204 as described with reference to FIG. 2. The vertical offset 204 may be outputted on the same display 402 as the lateral offset 206 or it may be displayed separately. The vertical offset may be entered or displayed in a smaller unit of measure than nautical miles, such as in feet because the vertical offset 204 is typically smaller than the lateral offset 206.

FMC 302 allows a user to enable the FMC to compute a random offset from the flight plan legs 104 within the boundary 108 or prescribed limits (e.g., zero to two nautical miles right, +/−65 feet vertically). In other embodiments, the user may be able to override the random offset 110 such as by manually entering another offset 110 or initiating a new random offset value. The offset 110 may be displayed to the flight crew via the FMC 302, and may be applied to the flight plan legs 104. The flight plan legs 104 may be flown by the aircraft autoflight system 304.

Figure 5:
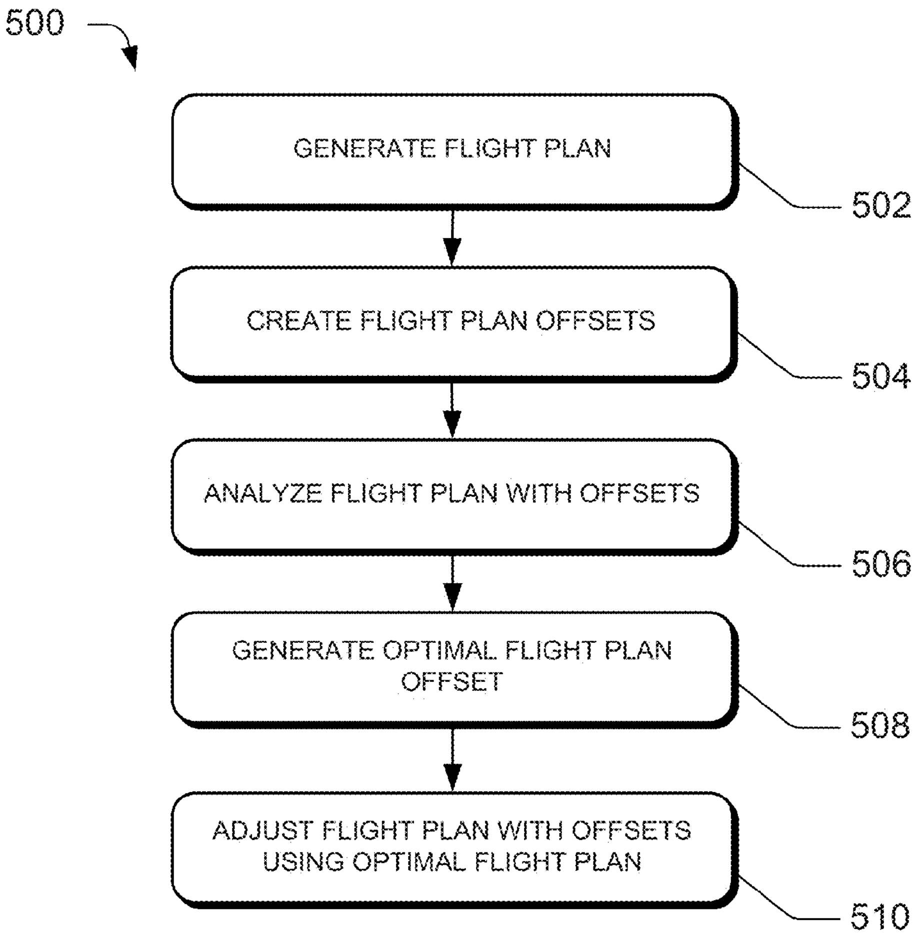
FIG. 5 is a flow diagram for generating an improved flight plan with a flight plan offset in accordance with another embodiment of the disclosure.

FIG. 5 is a flow diagram for generating an improved flight plan with a flight plan offset in accordance with another embodiment of the disclosure. A process 500 includes block 502 where a flight plan is generated. At block 504, the flight plan offsets are created. The flight plan offsets may be created automatically by the FMC 302, manually, or a combination of both. Additionally, the offsets may be segments, such as flight plan offsets 110*a*, 110*b*, and 110*c* in FIG. 1, or may be a continuous flight plan offset 110.

At block 506, the flight plan with offsets is analyzed by the FMC 302. At block 508, the optimum flight plan is generated. The FMC 302, or other computing system, may determine the optimum flight plan based on the programmed flight plan legs 104 and offsets 110. For example, the optimum flight plan may include passing through points identified as offsets 110 or otherwise incorporate the offset 110 into the flight plan to reduce fuel consumption, reduce flight time, or improve other aspects of the flight. At block 510, the flight plan with offsets is adjusted using the optimal flight plan. Generally, the process 500 may analyze the flight plan with offsets to determine opportunities with respect to the allowable offset to shorten the total distance traveled by "cutting corners," thus potentially reducing fuel consumption and/or reducing travel time.

Figure 6:
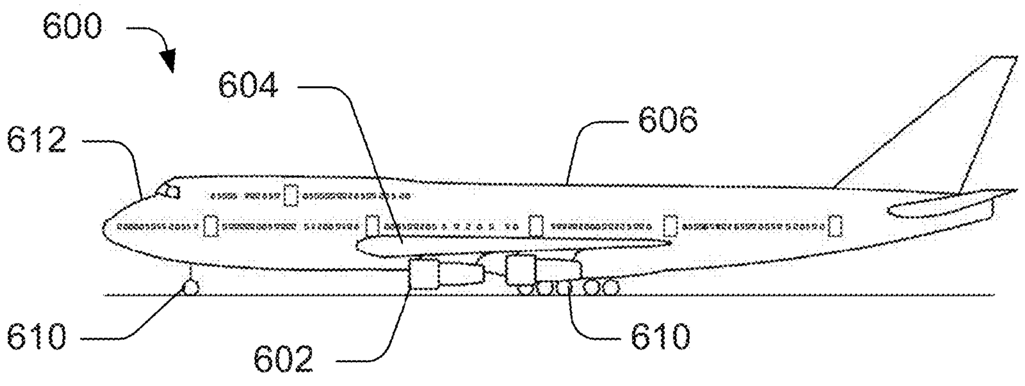
FIG. 6 is a side elevation view of an aircraft having one or more of the disclosed embodiments of the present disclosure.

Those skilled in the art will also readily recognize that the foregoing embodiments may be incorporated into a wide variety of different systems. Referring now in particular to FIG. 6, a side elevation view of an aircraft 600 having one or more of the disclosed embodiments of the present disclosure is shown. The aircraft 600 generally includes a variety of components and subsystems known in the pertinent art such as the flight management computer (FMC) 302, autoflight system 304 and sensor systems 306, and other components and subsystems, which in the interest of brevity, will not be described in detail. For example, the aircraft 600 generally includes one or more propulsion units 602 that are coupled to wing assemblies 604, or alternately, to a fuselage 606 or even other portions of the aircraft 600. Additionally, the aircraft 600 also includes a landing assembly 610 coupled to the fuselage 606, and a flight control system 612 (not shown in FIG. 6), as well as a plurality of other electrical, mechanical and electromechanical systems that cooperatively perform a variety of tasks necessary for the operation of the aircraft 600.

With reference still to FIG. 6, the aircraft 600 may include one or more of the embodiments of the automatic strategic offset according to the present disclosure, which may be incorporated into the flight control system 612 or other systems of the aircraft 600. The aircraft 600 is generally representative of a commercial passenger aircraft, which may include, for example without limitation, the 737, 747, 757, 767, 777 and 787 commercial passenger aircraft available from The Boeing Company of Chicago, Ill. In alternate embodiments, the present disclosure may also be incorporated into flight vehicles of other types, or other moveable platforms. Examples of such flight vehicles include manned or unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK. In addition, moveable vehicles may include maritime vessels, automobiles, and other moveable platforms for transit on land or in water.

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A navigation system comprising:

a flight system configured to determine a published flight plan of an aircraft and a boundary around the flight plan;

a location sensor configured to determine a location of the aircraft with respect at least one of the published flight plan or the boundary; and a flight controller configured to:

generate two or more flight plan segments, each flight plan segment to include an origination point that is proximate a termination point of a preceding segment, the two or more segments being contained within the boundary and offset from the published flight plan, wherein the offset is a random offset value that results in creation of the flight plan segments that are within the boundary and variably offset from the published flight plan; and generate a modified flight plan by connecting the two or more flight plan segments to create a continuous navigable flight plan that includes varying offsets from the published flight plan; and navigate the aircraft along the modified flight plan.

2. The system of claim 1, wherein the flight controller generates one or more offset values for a flight plan segment defined between successive published waypoints of the flight plan.

3. The system of claim 1, further comprising a display device to display the modified flight plan.

4. The system of claim 1, wherein the flight controller generates the offsets based at least in part on an operator input.

5. The system of claim 1, wherein the flight system controls the aircraft to navigate along the modified flight plan using the location sensor.

* * * * *